US012230881B2

(12) United States Patent
Huang

(10) Patent No.: US 12,230,881 B2
(45) Date of Patent: Feb. 18, 2025

(54) ANTENNA SYSTEM

(71) Applicant: Wistron NeWeb Corp., Hsinchu (TW)

(72) Inventor: Chun-Lin Huang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 183 days.

(21) Appl. No.: 18/155,338

(22) Filed: Jan. 17, 2023

(65) Prior Publication Data

US 2023/0261388 A1 Aug. 17, 2023

(30) Foreign Application Priority Data

Feb. 11, 2022 (TW) ................................. 111105006

(51) Int. Cl.

*H01Q 19/10* (2006.01)
*H01Q 1/22* (2006.01)
*H01Q 25/00* (2006.01)

(52) U.S. Cl.

CPC ......... *H01Q 19/108* (2013.01); *H01Q 1/2291* (2013.01); *H01Q 19/106* (2013.01); *H01Q 25/005* (2013.01)

(58) Field of Classification Search

CPC ........................... H01Q 1/2291; H01Q 25/005
See application file for complete search history.

(56) References Cited

U.S. PATENT DOCUMENTS 5,638,081 A * 6/1997 MacDonald ............. H01Q 1/44 343/890
2004/0021613 A1* 2/2004 Nesic ....................... H01Q 1/38 343/700 MS
2018/0183134 A1* 6/2018 Jan ........................... H01Q 3/24

FOREIGN PATENT DOCUMENTS

TW M295351 U 8/2006

* cited by examiner

*Primary Examiner* — Daniel Munoz
(74) *Attorney, Agent, or Firm* — McClure, Qualey & Rodack, LLP

(57) ABSTRACT

An antenna system includes a first antenna element, a second antenna element, a dielectric substrate, a first reflective plate, and a second reflective plate. The first antenna element and the second antenna element are disposed on the dielectric substrate. The first reflective plate is adjacent to the dielectric substrate. The second reflective plate is coupled to the first reflective plate. A first angle is formed between the first reflective plate and the second reflective plate. The antenna system provides a relative large HPBW (Half-Power Beamwidth).

18 Claims, 4 Drawing Sheets

ANTENNA SYSTEM

CROSS REFERENCE TO RELATED APPLICATIONS

This application claims priority of Taiwan Patent Application No. 111105006 filed on Feb. 11, 2022, the entirety of which is incorporated by reference herein.

BACKGROUND OF THE INVENTION

Field of the Invention

The disclosure generally relates to an antenna system, and more particularly, to an antenna system with a relatively large beamwidth.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has an insufficient beamwidth, it will degrade the communication quality of the relative device. Accordingly, it has become a critical challenge for antenna designers to design a small-size antenna element with a relatively large beamwidth.

BRIEF SUMMARY OF THE INVENTION

In an exemplary embodiment, the invention is directed to an antenna system that includes a first antenna element, a second antenna element, a dielectric substrate, a first reflective plate, and a second reflective plate. The first antenna element and the second antenna element are disposed on the dielectric substrate. The first reflective plate is adjacent to the dielectric substrate. The second reflective plate is coupled to the first reflective plate. A first angle is formed between the first reflective plate and the second reflective plate. The antenna system provides a relative large HPBW (Half-Power Beamwidth).

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
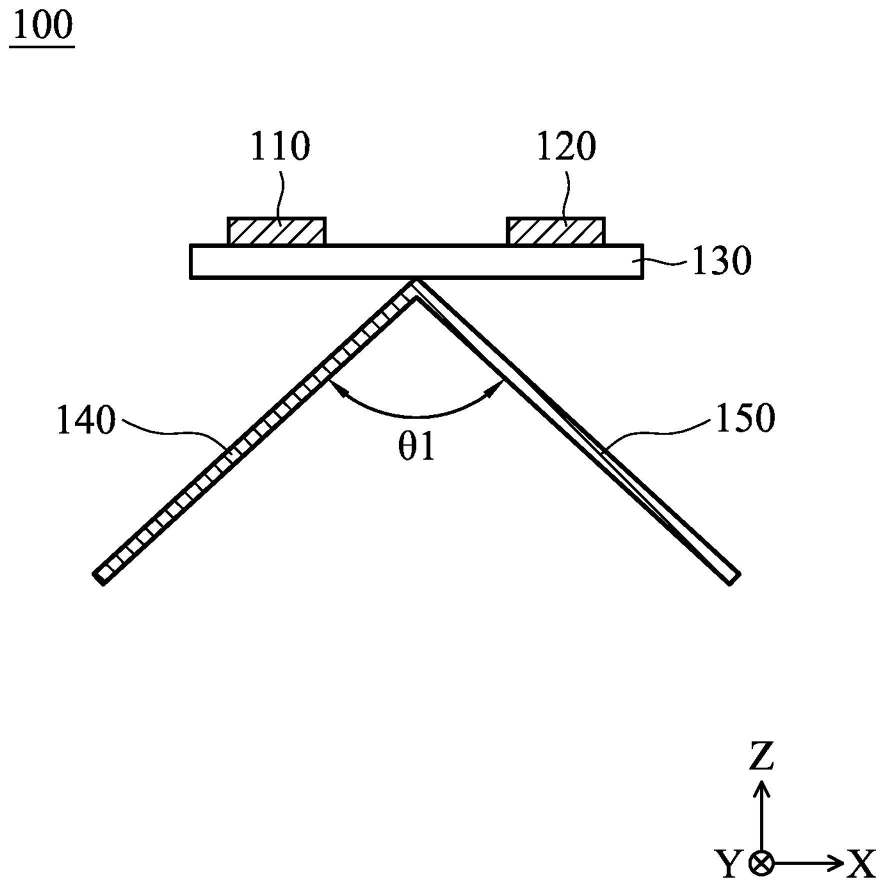
FIG. 1 is a sectional view of an antenna system according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a sectional view of an antenna system 100 according to an embodiment of the invention. For example, the antenna system 100 may be applied to a wireless access point, but it is not limited thereto. In the embodiment of FIG. 1, the antenna system 100 at least includes a first antenna element 110, a second antenna element 120, a dielectric substrate 130, a first reflective plate 140, and a second reflective plate 150. The first antenna element 110, the second antenna element 120, the first reflective plate 140, and the second reflective plate 150 may all be made of metal materials, such as copper, silver, aluminum, iron, or their alloys.

The shapes and types of the first antenna element 110 and the second antenna element 120 are not limited in the invention. For example, each of the first antenna element 110 and the second antenna element 120 may be a monopole antenna, a dipole antenna, a patch antenna, a loop antenna, a PIFA (Planar Inverted F Antenna), or a hybrid antenna.

The dielectric substrate 130 may be an FR4 (Flame Retardant 4) substrate, a PCB (Printed Circuit Board), or an FPC (Flexible Printed Circuit), but it is not limited thereto. The first antenna element 110 and the second antenna element 120 are both disposed on the dielectric substrate 130. In some embodiments, the first antenna element 110 and the second antenna element 120 are distributed over the same surface of the dielectric substrate 130. In alternative embodiments, the first antenna element 110 and the second antenna element 120 are distributed over different surfaces of the dielectric substrate 130.

The first reflective plate 140 and the second reflective plate 150 are coupled to each other. A first angle θ1 is formed between the first reflective plate 140 and the second reflective plate 150. Generally, the first reflective plate 140 and the second reflective plate 150 are configured to enhance the radiation gain of the first antenna element 110 and the second antenna element 120. In some embodiments, the first reflective plate 140 and the second reflective plate 150 are both adjacent to the dielectric substrate 130. It should be noted that the term "adjacent" or "close" over the disclosure means that the distance (spacing) between two corresponding elements is smaller than a predetermined distance (e.g., 10 mm or the shorter), or means that the two corresponding elements directly touch each other (i.e., the aforementioned distance/spacing between them is reduced to 0).

According to practical measurements, the proposed antenna system 100 of the invention can provide a relative large HPBW (Half-Power Beamwidth). For example, the HPBW of the antenna system 100 may be from 90 to 180 degrees, but it is not limited thereto. In some embodiments, the antenna system 100 can cover an operational frequency band from 2300 MHz to 2700 MHz. Therefore, the antenna system 100 can support at least the wideband operations of WLAN (Wireless Local Area Network) and LTE (Long Term Evolution).

The following embodiments will introduce different configurations and detailed structural features of the antenna system 100. It should be understood that these figures and descriptions are merely exemplary, rather than limitations of the invention.

Figure 2A:
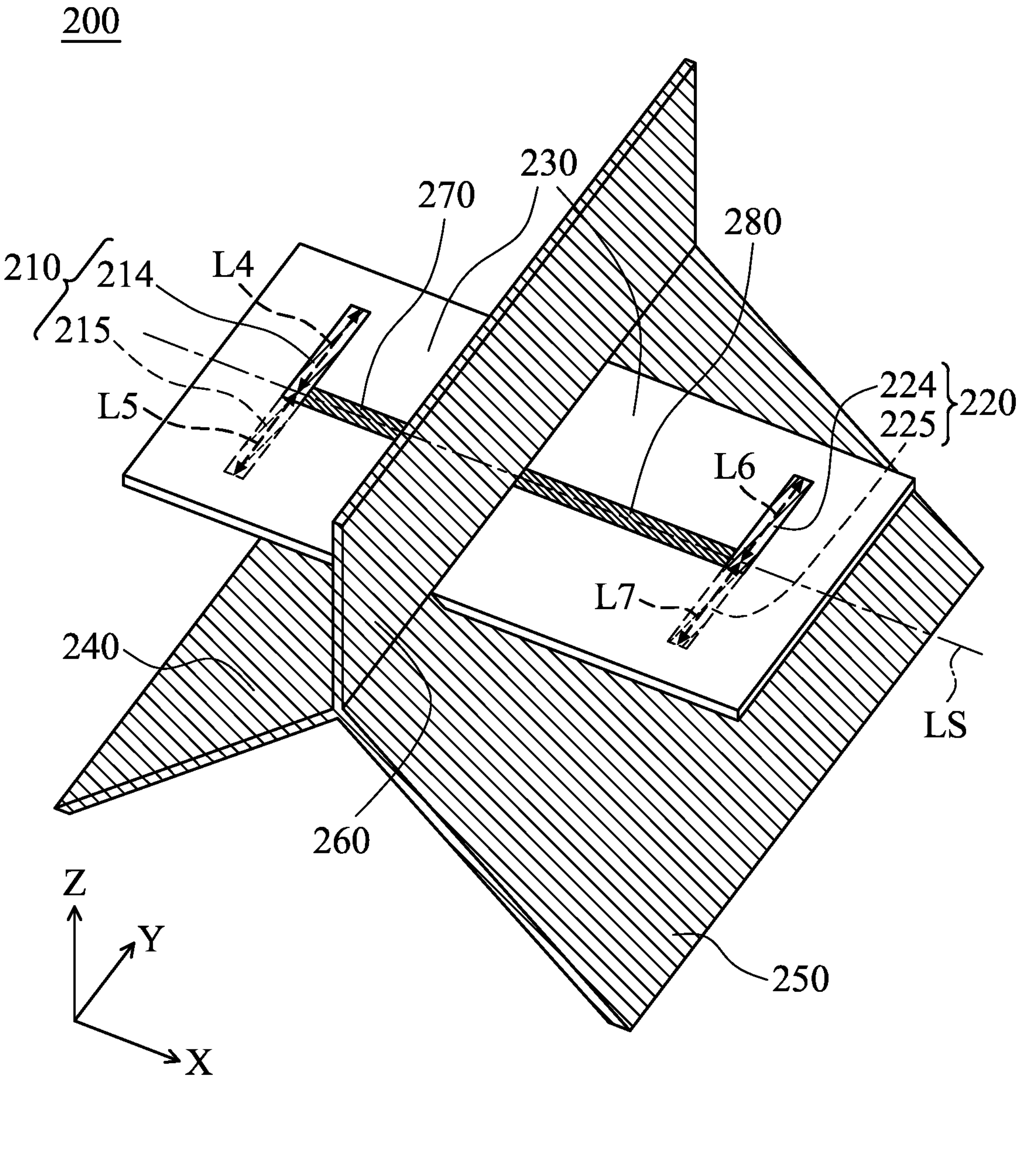
FIG. 2A is a perspective view of an antenna system according to an embodiment of the invention.
Figure 2B:
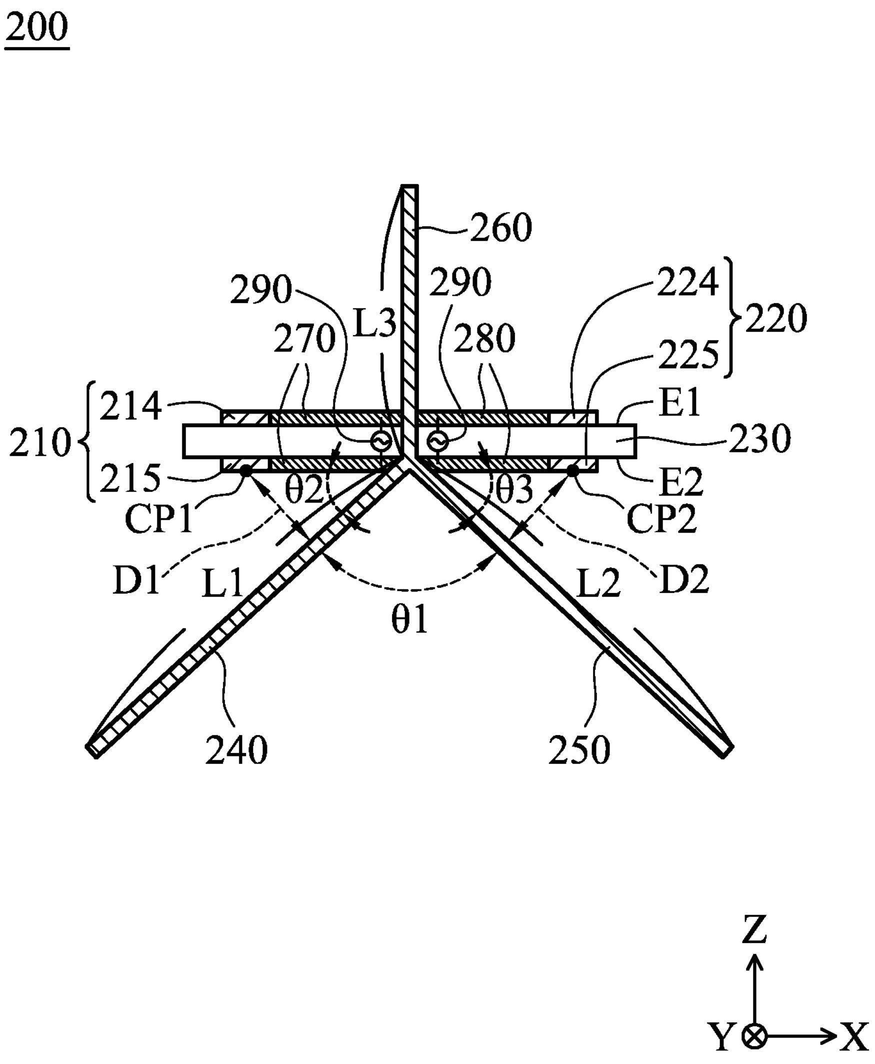
FIG. 2B is a sectional view of an antenna system according to an embodiment of the invention.

FIG. 2A is a perspective view of an antenna system 200 according to an embodiment of the invention. FIG. 2B is a sectional view of the antenna system 200 according to an embodiment of the invention (along a sectional line LS of FIG. 2A). Please refer to FIG. 2A and FIG. 2B together. In the embodiment of FIG. 2A and FIG. 2B, the antenna system 200 includes a first antenna element 210, a second antenna element 220, a dielectric substrate 230, a first reflective plate 240, a second reflective plate 250, a third reflective plate 260, a first transmission line 270, a second transmission line 280, and a signal source 290. The first antenna element 210, the second antenna element 220, the first reflective plate 240, the second reflective plate 250, the third reflective plate 260, the first transmission line 270, and the second transmission line 280 may all be made of metal materials.

Each of the first antenna element 210 and the second antenna element 220 may be a dipole antenna. Specifically, the first antenna element 210 includes a first radiation element 214 and a second radiation element 215, and the second antenna element 220 includes a third radiation element 224 and a fourth radiation element 225. In addition, the dielectric substrate 230 has a first surface E1 and a second surface E2 which are opposite to each other.

In the first antenna element 210, the first radiation element 214 is disposed on the first surface E1 of the dielectric substrate 230, and the second radiation element 215 is disposed on the second surface E2 of the dielectric substrate 230. The first radiation element 214 and the second radiation element 215 may substantially extend in opposite directions. In some embodiments, the first transmission line 270 is distributed over both of the first surface E1 and the second surface E2 of the dielectric substrate 230. The signal source 290 is coupled through the first transmission line 270 to the first radiation element 214 and the second radiation element 215, so as to excite the first antenna element 210.

In the second antenna element 220, the third radiation element 224 is disposed on the first surface E1 of the dielectric substrate 230, and the fourth radiation element 225 is disposed on the second surface E2 of the dielectric substrate 230. The third radiation element 224 and the fourth radiation element 225 may substantially extend in opposite directions. In some embodiments, the second transmission line 280 is distributed over both of the first surface E1 and the second surface E2 of the dielectric substrate 230. The signal source 290 is further coupled through the second transmission line 280 to the third radiation element 224 and the fourth radiation element 225, so as to excite the second antenna element 220. It should be noted that an antenna array is formed by the first antenna element 210 and the second antenna element 220.

The first reflective plate 240 and the second reflective plate 250 are coupled to each other. A first angle θ1 is formed between the first reflective plate 240 and the second reflective plate 250. In some embodiments, the first angle θ1 is calculated using the following equation (1):

$$\theta 1 = 180^\circ - \frac{(\theta B)}{2} \cdot (K1) \tag{1}$$

where "θ1" represents the first angle θ1, "θB" represents the HPBW of the antenna system 200, and "K1" represents the first adjustment constant from 0.8 to 1.2.

In some embodiments, a second angle θ2 is formed between the first reflective plate 240 and the dielectric substrate 230, and a third angle θ3 is formed between the second reflective plate 250 and the dielectric substrate 230. The second angle θ2 and the third angle θ3 are substantially equal to each other (i.e., θ2=θ3).

For example, the antenna system 200 may cover an operational frequency band from 2300 MHz to 2700 MHz, but it is not limited thereto. In some embodiments, the length L1 of the first reflective plate 240 and the length L2 of the second reflective plate 250 are calculated using the following equations (2) and (3):

$$L1 = \frac{\sqrt{2}}{4} \cdot \lambda \cdot (K2) \tag{2}$$

$$L2 = \frac{\sqrt{2}}{4} \cdot \lambda \cdot (K2) \tag{3}$$

where "L1" represents the length L1 of the first reflective plate 240, "L2" represents the length L2 of the second reflective plate 250, "λ" represents the wavelength of the central frequency of the operational frequency band of the antenna system 200, and "K2" represents the second adjustment constant from 0.7 to 2.

The third reflective plate 260 is coupled to both of the first reflective plate 240 and the second reflective plate 250. It should be noted that the third reflective plate 260 is disposed between the first antenna element 210 and the second antenna element 220. For example, the combination of the first reflective plate 240, the second reflective plate 250, and the third reflective plate 260 may substantially have a Y-shape. In some embodiments, the third reflective plate 260 penetrates the dielectric substrate 230. However, the invention is not limited thereto. In alternative embodiments, the third reflective plate 260 does not penetrate the dielectric substrate 230, and only a portion of the third reflective plate 260 is coupled to both of the first reflective plate 240 and the second reflective plate 250. According to practical measurements, the incorporation of the third reflective plate 260 can help to further increase the HPBW of the antenna system 200.

In some embodiments, the length L3 of the third reflective plate 260 is calculated using the following equation (4):

$$L3 = \frac{\sqrt{2}}{4} \cdot \lambda \cdot (K3) \quad (4)$$

where "L3" represents the length L3 of the third reflective plate 260, "λ" represents the wavelength of the central frequency of the operational frequency band of the antenna system 200, and "K3" represents the third adjustment constant from 0 to 1.5 (the third reflective plate 260 is omitted when K3 is equal to 0).

In some embodiments, the length L4 of the first radiation element 214, the length L5 of the second radiation element 215, the length L6 of the third radiation element 224, and the length L7 of the fourth radiation element 225 are calculated using the following equation (5):

$$L4 = L5 = L6 = L7 = \frac{1}{4} \cdot \lambda \quad (5)$$

where "L4" represents the length L4 of the first radiation element 214, "L5" represents the length L5 of the second radiation element 215, "L6" represents the length L6 of the third radiation element 224, "L7" represents the length L7 of the fourth radiation element 225, and "λ" represents the wavelength of the central frequency of the operational frequency band of the antenna system 200.

A first distance D1 is defined between the central point CP1 of the second radiation element 215 and the first reflective plate 240. A second distance D2 is defined between the central point CP2 of the fourth radiation element 225 and the second reflective plate 250. In some embodiments, the first distance D1 and the second distance D2 are calculated using the following equations (6) and (7):

$$D1 = \frac{1}{4} \cdot \lambda \cdot (K4) \quad (6)$$

$$D2 = \frac{1}{4} \cdot \lambda \cdot (K4) \quad (7)$$

where "D1" represents the first distance D1, "D2" represents the second distance D2, "λ" represents the wavelength of the central frequency of the operational frequency band of the antenna system 200, and "K4" represents the fourth adjustment constant from 0.7 to 2.

Figure 3:
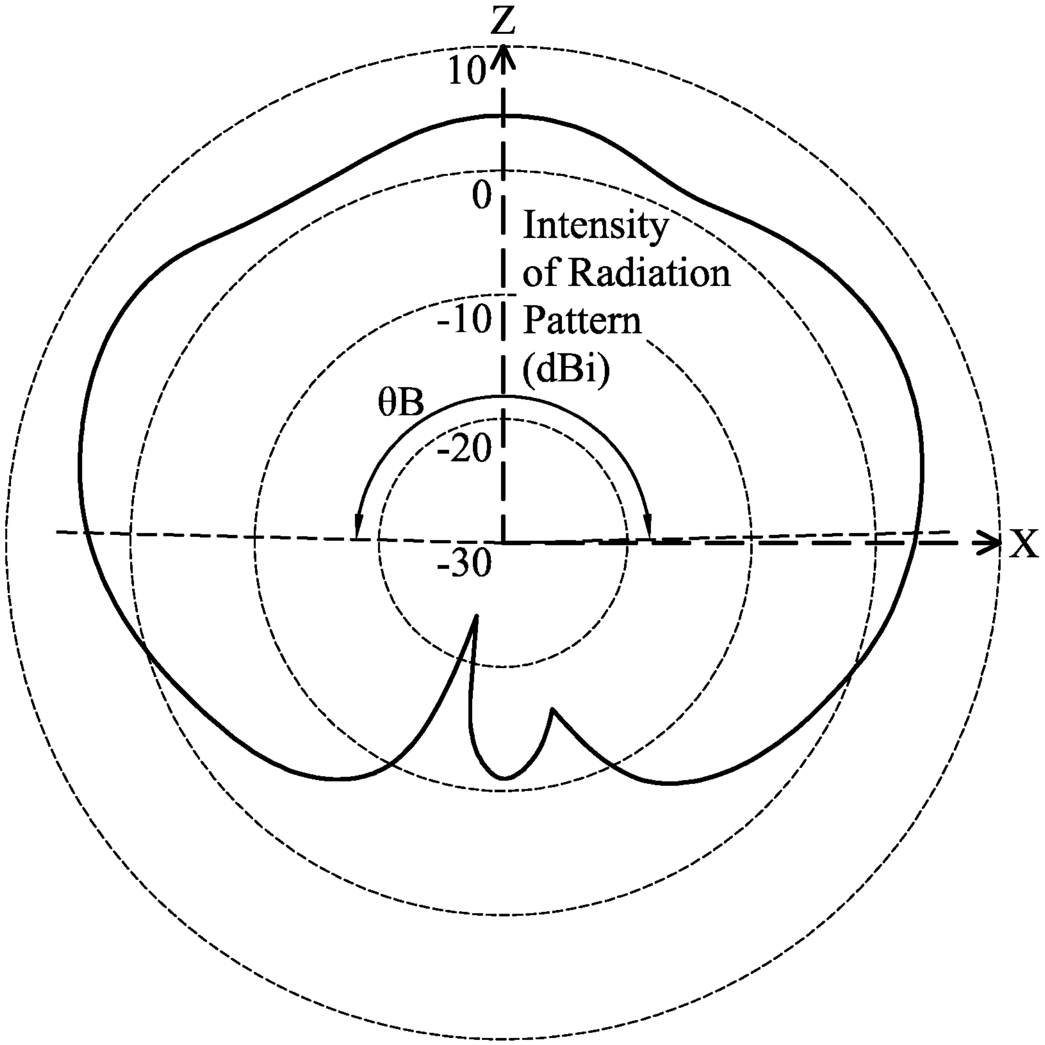
FIG. 3 is a radiation pattern of an antenna system according to an embodiment of the invention.

FIG. 3 is a radiation pattern of the antenna system 200 according to an embodiment of the invention (it may be measured along the XZ-plane). Based on the measurement of FIG. 3, the antenna system 200 provides a relative large HPBW θB. For example, the HPBW θB of the antenna system 200 may be from 90 to 180 degrees, but it is not limited thereto. In addition, the front-to-back ratio of the antenna system 200 can reach 15 dB or higher, and it can meet the requirements of practical applications of general communication devices. It should be understood that the designed ranges of the above equations (1) to (7) are obtained according to many experiment results, and they help to optimize the HPBW, the front-to-back ratio, the operational bandwidth, and the impedance matching of the antenna system 200.

The invention proposes a novel antenna system. In comparison to the conventional design, the invention has at least the advantages of relatively large HPBW, relatively high front-to-back ratio, and relatively low manufacturing cost. Therefore, the invention is suitable for application in a variety of communication devices.

Note that the above element sizes, element shapes, and frequency ranges are not limitations of the invention. An antenna designer can fine-tune these settings or values according to different requirements. It should be understood that the antenna system of the invention is not limited to the configurations of FIGS. 1-3. The invention may merely include any one or more features of any one or more embodiments of FIGS. 1-3. In other words, not all of the features displayed in the figures should be implemented in the antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna system, comprising:

a first antenna element;

a second antenna element;

a dielectric substrate, wherein the first antenna element and the second antenna element are disposed on the dielectric substrate;

a first reflective plate, disposed adjacent to the dielectric substrate; and a second reflective plate, coupled to the first reflective plate, wherein a first angle is formed between the first reflective plate and the second reflective plate;

wherein the antenna system provides an HPBW (Half-Power Beamwidth) from 90 to 180 degrees;

wherein the antenna system covers an operational frequency band;

wherein a length of the first reflective plate is calculated using the following equation:

$$L1 = \frac{\sqrt{2}}{4} \cdot \lambda \cdot (K2)$$

where "L1" represents the length of the first reflective plate, "λ" represents a wavelength of a central frequency of the operational frequency band, and "K2" represents a second adjustment constant from 0.7 to 2.

2. The antenna system as claimed in claim 1, wherein the operational frequency band is from 2300 MHz to 2700 MHz.

3. The antenna system as claimed in claim 2, wherein a length of the second reflective plate is calculated using the following equation:

$$L2 = \frac{\sqrt{2}}{4} \cdot \lambda \cdot (K2)$$

where "L2" represents the length of the second reflective plate, "λ" represents a wavelength of a central frequency of the operational frequency band, and "K2" represents a second adjustment constant from 0.7 to 2.

4. The antenna system as claimed in claim 2, further comprising:

a third reflective plate, coupled to the first reflective plate and the second reflective plate, wherein the third reflective plate is disposed between the first antenna element and the second antenna element.

5. The antenna system as claimed in claim 4, wherein a combination of the first reflective plate, the second reflective plate, and the third reflective plate substantially has a Y-shape.

6. The antenna system as claimed in claim 4, wherein a length of the third reflective plate is calculated using the following equation:

$$L3 = \frac{\sqrt{2}}{4} \cdot \lambda \cdot (K3)$$

where "L3" represents the length of the third reflective plate, "λ" represents a wavelength of a central frequency of the operational frequency band, and "K3" represents a third adjustment constant from 0 to 1.5.

7. The antenna system as claimed in claim 2, wherein the dielectric substrate has a first surface and a second surface opposite to each other.

8. The antenna system as claimed in claim 7, wherein the first antenna element comprises:

a first radiation element, disposed on the first surface of the dielectric substrate; and a second radiation element, disposed on the second surface of the dielectric substrate, wherein the first radiation element and the second radiation element substantially extend in opposite directions.

9. The antenna system as claimed in claim 8, wherein a length of each of the first radiation element and the second radiation element is substantially equal to 0.25 wavelength of a central frequency of the operational frequency band.

10. The antenna system as claimed in claim 8, wherein the second antenna element comprises:

a third radiation element, disposed on the first surface of the dielectric substrate; and a fourth radiation element, disposed on the second surface of the dielectric substrate, wherein the third radiation element and the fourth radiation element substantially extend in opposite directions.

11. The antenna system as claimed in claim 10, wherein a length of each of the third radiation element and the fourth radiation element is substantially equal to 0.25 wavelength of a central frequency of the operational frequency band.

12. The antenna system as claimed in claim 10, wherein a first distance is defined between a central point of the second radiation element and the first reflective plate, and a second distance is defined between a central point of the fourth radiation element and the second reflective plate.

13. The antenna system as claimed in claim 12, wherein the first distance is calculated using the following equation:

$$D1 = \frac{1}{4} \cdot \lambda \cdot (K4)$$

where "D1" represents the first distance, "λ" represents a wavelength of a central frequency of the operational frequency band, and "K4" represents a fourth adjustment constant from 0.7 to 2.

14. The antenna system as claimed in claim 12, wherein the second distance is calculated using the following equation:

$$D2 = \frac{1}{4} \cdot \lambda \cdot (K4)$$

where "D2" represents the second distance, "λ" represents a wavelength of a central frequency of the operational frequency band, and "K4" represents a fourth adjustment constant from 0.7 to 2.

15. The antenna system as claimed in claim 1, wherein each of the first antenna element and the second antenna element is a dipole antenna.

16. The antenna system as claimed in claim 1, wherein the first angle is calculated using the following equation:

$$\theta1 = 180° - \frac{(\theta B)}{2} \cdot (K1)$$

where "θ1" represents the first angle, "θB" represents the HPBW, and "K1" represents a first adjustment constant from 0.8 to 1.2.

17. The antenna system as claimed in claim 1, wherein a second angle is formed between the first reflective plate and the dielectric substrate, a third angle is formed between the second reflective plate and the dielectric substrate, and the second angle and the third angle are substantially equal to each other.

18. The antenna system as claimed in claim 1, further comprising:

a first transmission line, wherein a signal source is coupled through the first transmission line to the first antenna element; and a second transmission line, wherein the signal source is further coupled through the second transmission line to the second antenna element.

* * * * *